(12) United States Patent
Wang

(10) Patent No.: US 9,632,565 B2
(45) Date of Patent: Apr. 25, 2017

(54) POWER SUPPLY MODE SWITCHING METHOD AND APPARATUS

(71) Applicant: Lenovo (Beijing) Co., Ltd., Beijing (CN)

(72) Inventor: Jing Wang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 7 days.

(21) Appl. No.: 14/788,136

(22) Filed: Jun. 30, 2015

(65) Prior Publication Data

US 2016/0252950 A1 Sep. 1, 2016

(30) Foreign Application Priority Data

Feb. 26, 2015 (CN) .......................... 2015 1 0088793

(51) Int. Cl.
*G06F 1/32* (2006.01)
*G06F 1/16* (2006.01)

(52) U.S. Cl.
CPC .......... *G06F 1/3287* (2013.01); *G06F 1/1694* (2013.01); *G06F 1/3206* (2013.01); *G06F 1/3231* (2013.01); *G06F 1/3234* (2013.01); *G06F 2200/1637* (2013.01)

(58) Field of Classification Search
CPC ..... G06F 1/3206; G06F 1/3265; G06F 1/3287
See application file for complete search history.

(56) References Cited

U.S. PATENT DOCUMENTS

| | | | | |
|---|---|---|---|---|
| 7,406,612 | B2* | 7/2008 | O'Connor | G06F 1/3203 713/300 |
| 2006/0126280 | A1* | 6/2006 | Wu | G06F 1/1616 361/679.08 |
| 2007/0201198 | A1* | 8/2007 | Andou | G06F 1/3203 361/679.55 |
| 2008/0254822 | A1* | 10/2008 | Tilley | G06F 1/1626 455/550.1 |
| 2010/0167792 | A1* | 7/2010 | Chen | G06F 1/3203 455/566 |
| 2013/0027860 | A1* | 1/2013 | Masaki | G06F 1/1626 361/679.01 |

* cited by examiner

*Primary Examiner* — Dennis M Butler
(74) *Attorney, Agent, or Firm* — Brinks Gilson & Lione; G. Peter Nichols

(57) ABSTRACT

A power supply mode switching method and apparatus applied to an electronic device are described. The method includes detecting a mode switching signal of the electronic device; switching a power supply mode of the electronic device from a first power supply mode to a second power supply mode if the mode switching signal detected indicates to switch the electronic device from a first mode to a second mode; switching the power supply mode of the electronic device from the second power supply mode to the first power supply mode if the mode switching signal detected indicates to switch the electronic device from the second mode to the first mode. The power supply mode switching method makes the electronic device not enter into the power-off mode immediately when the user presses the power button by accident in the second mode of the electronic device.

14 Claims, 4 Drawing Sheets

POWER SUPPLY MODE SWITCHING METHOD AND APPARATUS

This application claims priority to Chinese Patent Application No. 201510088793.1 filed on Feb. 26, 2015; the entire contents of which are incorporated herein by reference.

The present disclosure relates to a mode switching method, and more particularly, to a power supply mode switching method.

BACKGROUND

At present, in an intelligent desktop mode of Tablet PCs, especially when multiple users operate the intelligent desktop through touch control, it often happens that a user presses a power button by accident. In this case, since currently in the intelligent desktop mode of Tablet PCs, the power button is set to immediately power off a Tablet PC as long as the power button is pressed when the Tablet PC is in a power-on state, such phenomenon of disrupting current using of the user due to power-off caused by disoperation will seriously affect usability of tablet PCs, and reduce using experience of the user.

So it is a problem in urgent need of being solved that how to carry out some optimizations on the power managing mode of the conventional Tablet PCs, so that Tablet PCs will not go into the power-off mode immediately when the user presses the power button by accident in the intelligent desktop mode of Tablet PCs, the intelligent desktop mode of Tablet PCs becomes more practical and using experience of the user is improved.

SUMMARY

To solve the above technical problem in the prior art, according to an aspect of the present disclosure, there is provided a power supply mode switching method applied to an electronic device. The method comprises: detecting a mode switching signal of the electronic device; switching a power supply mode of the electronic device from a first power supply mode to a second power supply mode if the mode switching signal detected indicates to switch the electronic device from a first mode to a second mode; and switching the power supply mode of the electronic device from the second power supply mode to the first power supply mode if the mode switching signal detected indicates to switch the electronic device from the second mode to the first mode, wherein an angle between a display screen of the electronic device and a horizontal plane is not less than 45 degrees in the first mode, and when it is detected that a power button has been pressed in the first power supply mode, a first signal of the electronic device is triggered immediately; and the angle between the display screen of the electronic device and the horizontal plane is less than 45 degrees in the second mode, and it is required to detect a first operation of a user continuously after it is detected that the power button has been pressed in the second power supply mode, the first signal of the electronic device is triggered until the first operation of the user has been detected.

In addition, according to an embodiment of the present disclosure, the first signal is a power-on signal or a power-off signal.

In addition, according to an embodiment of the present disclosure, the display screen of the electronic device is perpendicular to the horizontal plane in the first mode.

In addition, according to an embodiment of the present disclosure, the display screen of the electronic device coincides with the horizontal plane in the second mode.

In addition, according to an embodiment of the present disclosure, the first operation of the user includes that the user keeps pressing the power button for longer than 2 seconds, or the user performs a touch gesture operation on the electronic device to power on or power off the electronic device according to a screen prompt.

In addition, according to an embodiment of the present disclosure, the mode switching signal is generated by a gesture detection module of the electronic device.

According to another aspect of the present disclosure, there is provided a power supply mode switching apparatus applied to an electronic device. The apparatus comprises: a detecting unit configured to detect a mode switching signal of the electronic device; a first switching unit configured to switch a power supply mode of the electronic device from a first power supply mode to a second power supply mode if the mode switching signal detected indicates to switch the electronic device from a first mode to a second mode; a second switching unit configured to switch the power supply mode of the electronic device from the second power supply mode to the first power supply mode if the mode switching signal detected indicates to switch the electronic device from the second mode to the first mode, wherein an angle between a display screen of the electronic device and a horizontal plane is not less than 45 degrees in the first mode, and when it is detected that a power button has been pressed in the first power supply mode, a first signal of the electronic device is triggered immediately; and the angle between the display screen of the electronic device and the horizontal plane is less than 45 degrees in the second mode, and it is required to detect a first operation of a user continuously after it is detected that the power button has been pressed in the second power supply mode, the first signal of the electronic device is triggered until the first operation of the user has been detected.

In addition, according to an embodiment of the present disclosure, the first signal is a power-on signal or a power-off signal.

In addition, according to an embodiment of the present disclosure, the display screen of the electronic device is perpendicular to the horizontal plane in the first mode.

In addition, according to an embodiment of the present disclosure, the display screen of the electronic device coincides with the horizontal plane in the second mode.

In addition, according to an embodiment of the present disclosure, the first operation of the user includes that the user keeps pressing the power button for longer than 2 seconds, or the user performs a touch gesture operation on the electronic device to power on or power off the electronic device according to a screen prompt.

In addition, according to an embodiment of the present disclosure, the mode switching signal is generated by a gesture detection module of the electronic device.

Accordingly, the power supply mode switching method and apparatus provided by the present disclosure can carry out some optimizations on the power managing mode of the conventional Tablet PCs, so that Tablet PCs will not go into the power-off mode immediately when the user presses the power button by accident in the intelligent desktop mode of Tablet PCs, which avoids the risk of disrupting a current operation due to disoperation, causes the intelligent desktop mode of Tablet PCs to become more practical, and improves using experience of the user.

DETAILED DESCRIPTION

Hereinafter, preferred embodiments of the present application will be described in detail with reference to the accompanying drawings. It should be noted that, in the specification and the accompanying drawings, steps and elements that are essentially the same are represented by the same reference signs, and repeated descriptions for these steps and elements will be omitted.

The "one embodiment" or "an embodiment" mentioned throughout this specification means that the specific features, structures, or characteristics described in conjunction with the embodiment are included in at least one of the described embodiments. Therefore, appearing of the phrase "in one embodiment" or "in an embodiment" in the specification does not necessarily refer to only a single embodiment. Furthermore, said specific features, structures, or characteristics may be combined in one or more embodiments in any suitable manners.

Figure 1:
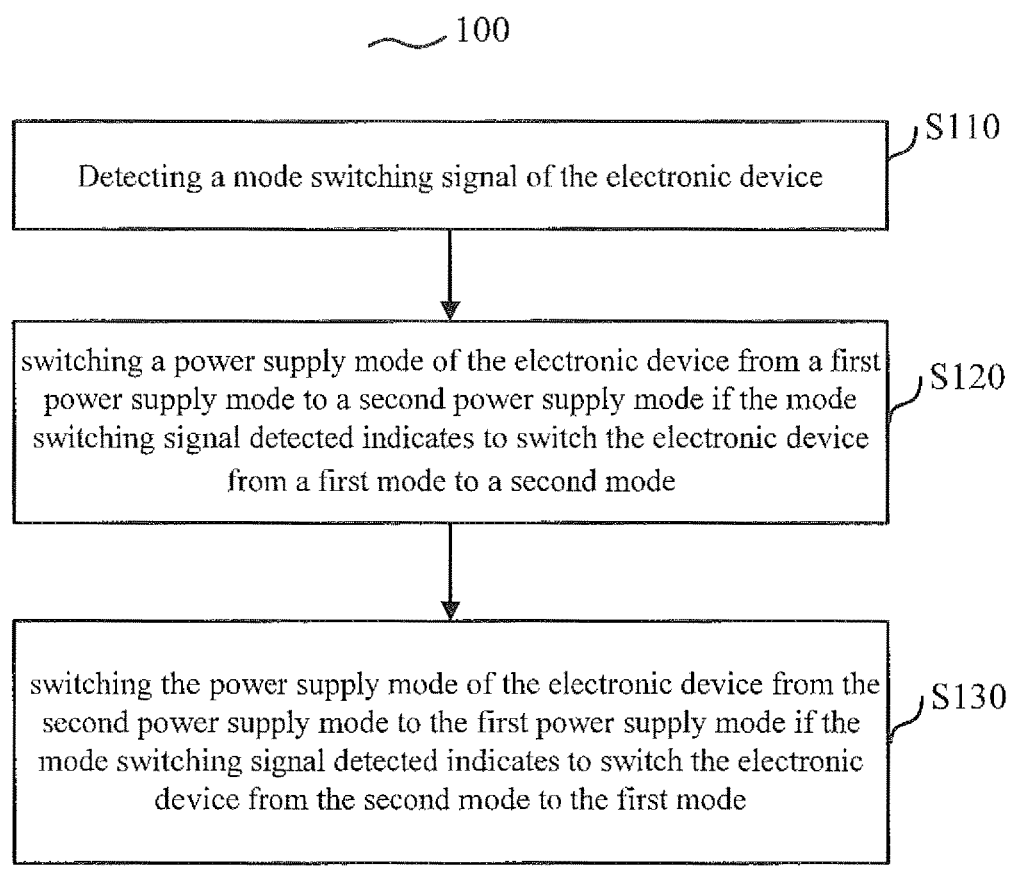
FIG. 1 is a flowchart of a power supply mode switching method 100 applied to an electronic device according to an embodiment of the present disclosure.

FIG. 1 is a flowchart of a power supply mode switching method 100 applied to an electronic device according to an embodiment of the present disclosure. The electronic device has a display screen that can be set in one of multiple directions, and in particular, the display screen may be set in a horizontal direction or in a vertical direction perpendicular to a horizontal plane.

The power supply mode switching method 100 applied to an electronic device according to an embodiment of the present disclosure will be described below with reference to FIG. 1. As shown in FIG. 1, first, in step S110, a mode switching signal of an electronic device is detected. In particular, the mode switching signal may be generated by a gesture detection module of the electronic device. Generally, whether a mode change has occurred to the electronic device can be detected via various sensors. In an embodiment of the present disclosure, an acceleration sensor may be used to detect a posture or gesture change of the electronic device, when it is detected via the acceleration sensor that the electronic device has switched from a first mode to a second mode, or from the second mode to the first mode, the gesture detection module can always generate a corresponding mode switching signal.

Next, in step S120, if the mode switching signal detected indicates to switch the electronic device from the first mode to the second mode, a power supply mode of the electronic device is switched from a first power supply mode to a second power supply mode. An angle between a display screen of the electronic device and a horizontal plane may be not less than 45 degrees in the first mode, and the angle between the display screen of the electronic device and the horizontal plane may be less than 45 degrees in the second mode. In particular, the display screen of the electronic device may be perpendicular to the horizontal plane in the first mode, and the display screen of the electronic device may coincide with the horizontal plane in the second mode. In addition, in an embodiment of the present disclosure, it is also possible to set the first mode of the electronic device as a mode of the electronic device in which the angle between the display screen of the electronic device and the horizontal plane is more than a first predetermined angle and less than 90 degrees. In another embodiment of the present disclosure, it is also possible to set the second mode of the electronic device as a mode of the electronic device in which the angle between the display screen of the electronic device and the horizontal plane is less than a second predetermined angle. The first predetermined angle may generally be more than 45 degrees and less than 90 degrees, for instance, in an example of the present disclosure, the first predetermined angle may be set as 70 degrees. The second predetermined angle may generally be less than 45 degrees, for instance, in an example of the present disclosure, the second predetermined angle may be set as 20 degrees. That is to say, the first mode of the electronic device may be set as a mode of the electronic device in which it is detected that the angle between the display screen of the electronic device and the horizontal plane closes to or is 90 degrees; the second mode of the electronic device may be set as a mode of the electronic device in which it is detected that the angle between the display screen of the electronic device and the horizontal plane closes to or is 0 degrees.

In addition, when it is detected that a power button has been pressed in the first power supply mode, a first signal of the electronic device may be triggered immediately; and it is required to detect a first operation of a user continuously after it is detected that the power button has been pressed in the second power supply mode, the first signal of the electronic device is triggered until the first operation of the user has been detected. The first signal may be a power-on signal or a power-off signal. The first operation of the user may include that the user keeps pressing the power button for longer than 2 seconds, or the user performs a touch gesture operation on the electronic device to power on or power off the electronic device according to a screen prompt. In an example, the time for which the user keeps pressing the power button may be set as a value more than 2 seconds.

For instance, in an example of the present disclosure, if the first mode of the electronic device is set as the mode in which the angle between the display screen of the electronic device and the horizontal plane is not less than 45 degrees, and the second mode of the electronic device is set as the mode in which the angle between the display screen of the electronic device and the horizontal plane is less than 45 degrees. In case that it is detected that the angle between the display screen of the electronic device and the horizontal plane is not less than 45 degrees, the power-off signal can be triggered immediately when the user presses the power button. On the other hand, in case that it is detected that the angle between the display screen of the electronic device and the horizontal plane is less than 45 degrees, when it is detected that the power button has been pressed, it is required to detect continuously, and the power-off signal is triggered until it is found out that the time for which the power button is pressed reaches 2 seconds or the user performs a touch gesture operation on the electronic device to power on or power off the electronic device according to the screen prompt.

In particular, the display screen of the electronic device may be perpendicular to the horizontal plane in the first mode, and the display screen of the electronic device may coincide with the horizontal plane in the second mode. In this case, when it is detected that the display screen of the electronic device is in the vertical direction, the power-off signal may be triggered immediately when the user presses the power button; whereas when it is detected that the display screen of the electronic device is in the horizontal direction, the power-off signal is triggered only when it is detected that the time for which the user continuously presses the power button reaches 2 seconds or the user performs a touch gesture operation on the electronic device to power on or power off the electronic device according to the screen prompt after it is detected that the user has pressed the power button.

In addition, in an embodiment of the present disclosure, it is also possible to set the first mode of the electronic device as the mode of the electronic device in which the angle between the display screen of the electronic device and the horizontal plane is more than a first predetermined angle and less than 90 degrees, and set the second mode of the electronic device as the mode of the electronic device in which the angle between the display screen of the electronic device and the horizontal plane is less than a second predetermined angle. That is to say, the first mode of the electronic device is set as the mode of the electronic device in which it is detected that the angle between the display screen of the electronic device and the horizontal plane closes to or is 90 degrees; the second mode of the electronic device is set as the mode of the electronic device in which it is detected that the angle between the display screen of the electronic device and the horizontal plane closes to or is 0 degrees. In this case, when it is detected that the display screen of the electronic device closes to or is 90 degrees, the power-off signal can be triggered immediately when the user presses the power button; whereas when it is detected that the display screen of the electronic device closes to or is 0 degrees, the power-off signal is triggered only when it is detected that the time for which the user continuously presses the power button reaches 2 seconds or the user performs a touch gesture operation on the electronic device to power on or power off the electronic device according to the screen prompt after it is detected that the user has pressed the power button.

Thereafter, in step S130, if the mode switching signal detected indicates to switch the electronic device from the second mode to the first mode, the power supply mode of the electronic device is switched from the second power supply mode to the first power supply mode. For instance, in an example of the present disclosure, the angle between a display screen of the electronic device and a horizontal plane may be not less than 45 degrees in the first mode, and the angle between the display screen of the electronic device and the horizontal plane may be less than 45 degrees in the second mode. Accordingly, when it is detected that the angle between the display screen of the electronic device and the horizontal plane rotates from being less than 45 degrees to being not less than 45 degrees, the power supply mode of the electronic device may be switched to the mode in which the power-off signal can be triggered immediately after the user presses the power button; when it is detected that the angle between the display screen of the electronic device and the horizontal plane rotates from being not less than 45 degrees to being less than 45 degrees, detection will be performed continuously when it is detected that the user presses the power button, the power-off signal is triggered until it is found out that the time for which the power button is pressed reaches 2 seconds or the user performs a touch gesture operation on the electronic device to power on or power off the electronic device according to the screen prompt.

Figure 2:
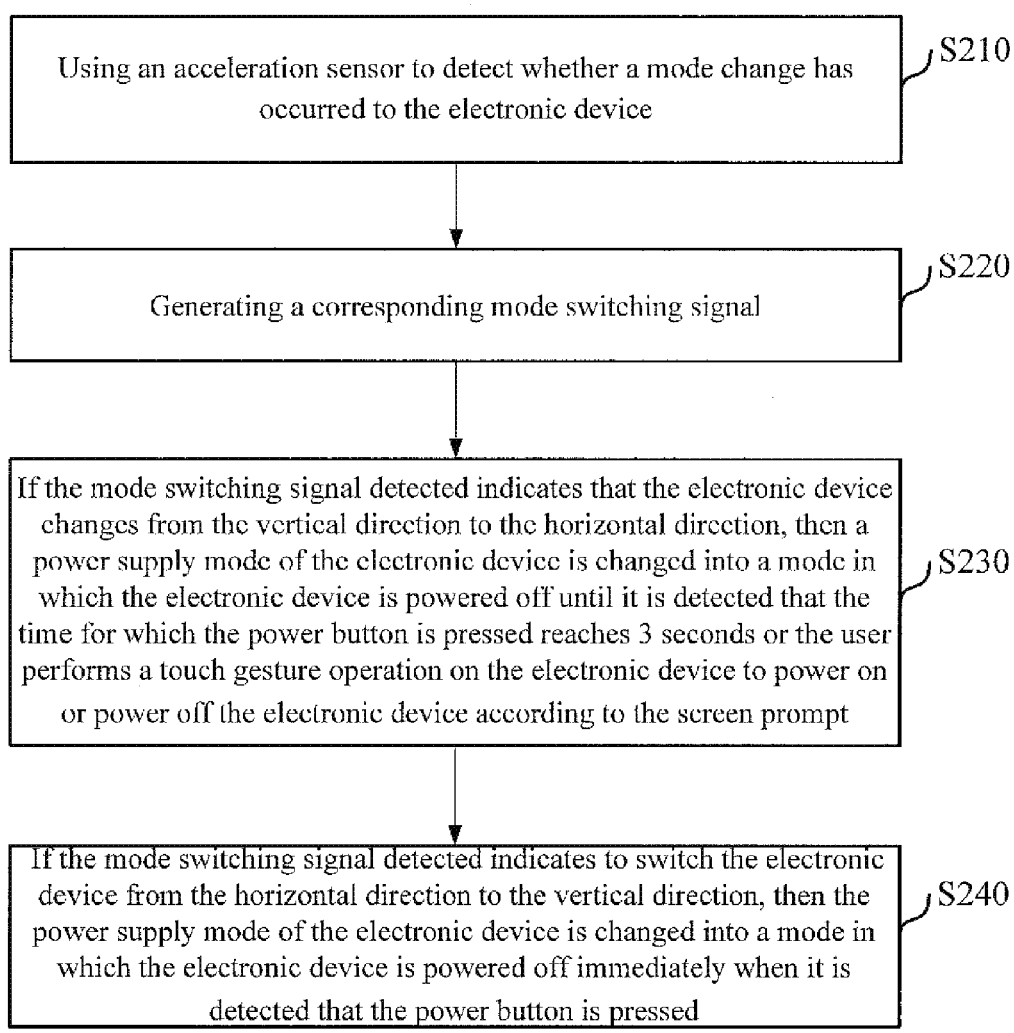
FIG. 2 is a flowchart of a power supply mode switching method 200 applied to an electronic device according to an example of the present disclosure.

In order to illustrate, in more detail, using of the method provided by the present disclosure in the above embodiment, examples are provided with reference to FIG. 2. FIG. 2 is a flowchart of a power supply mode switching method 200 applied to an electronic device according to an example of the present disclosure. The electronic device has a display screen that can be set in a horizontal direction or in a vertical direction. In particular, in this example, the power supply mode switching method 200 applied to the electronic device according to the example of the present disclosure may comprise the following steps.

As shown in FIG. 2, first, a mode switching signal of the electronic device may be detected. Particularly, this step may comprise two sub-steps as follows: in step 210, an acceleration sensor is used to detect whether a mode change has occurred to the electronic device, when it is detected via the acceleration sensor that a mode change has occurred to the electronic device, for instance, it is detected by the acceleration sensor that the electronic device changes from the horizontal direction to the vertical direction, or from the vertical direction to the horizontal direction; then in step S220, a corresponding mode switching signal may be generated and detected.

Thereafter, if the mode switching signal detected indicates to switch the electronic device from a first mode to a second mode, then a power supply mode of the electronic device is switched from a first power supply mode to a second power supply mode. In this example, this step may in particular comprise: in step S230, if the mode switching signal detected indicates that the electronic device changes from the vertical direction to the horizontal direction, then the power supply mode of the electronic device is changed into the mode in which the electronic device is powered off until it is detected that the time for which the power button is pressed reaches 3 seconds or the user performs a touch gesture operation on the electronic device to power on or power off the electronic device according to the screen prompt after it is detected that the user has pressed the power button.

When the display screen of the electronic device is in the horizontal direction, it may be a case that multiple persons are using the display screen to perform various operations on the display screen, and it may probably happen that a user presses the power button by accident. In this case, if the power button is configured to enable the electronic device to be powered off once it is pressed, such phenomenon of disrupting a current game of the user due to power-off caused by disoperation will bring extremely bad experience to the user. However, according to the power supply mode switching method provided by the present disclosure, in the case that the display screen of the electronic device is placed in the horizontal direction, when it is detected that the power button is pressed, the detection will be performed continuously, and a power-off mode can be entered until it is found out that the time for which the power button is pressed reaches 3 seconds, which thereby avoids the risk of disrupting a current operation due to disoperation.

In addition, if the mode switching signal detected indicates to switch the electronic device from the second mode to the first mode, then the power supply mode of the electronic device is switched from the second power supply mode to the first power supply mode. In this example, this step may in particular comprise: in step S240, if the mode switching signal detected indicates to switch the electronic device from the horizontal direction to the vertical direction, then the power supply mode of the electronic device is changed into the mode in which the electronic device is powered off immediately when it is detected that the power button is pressed.

Thus it can be seen that, in this example, when the electronic device is placed in the vertical direction, the electronic device usually operates in a personal computer mode. Generally, when the electronic device operates in the personal computer mode, in most cases it is one user that operates the electronic device. Therefore, according to the power supply mode switching method provided by the present disclosure, when the display screen of the electronic device is placed in the vertical direction, the conventional power-off manner is retained, that is, the electronic device can be powered off immediately once the power button is pressed, which satisfies the use's requirement of fast power-off of the electronic device in the personal computer mode in which the electronic device is used by a single user.

Accordingly, by using the power supply mode switching method 100 provided by the present disclosure, some optimizations can be carried out on the power managing mode of the conventional Tablet PCs, so that Tablet PCs will not enter into the power-off mode immediately when the user presses the power button by accident in the intelligent desktop mode of Tablet PCs, the intelligent desktop mode of Tablet PCs becomes more practical and using experience of the user is improved.

Figure 3:
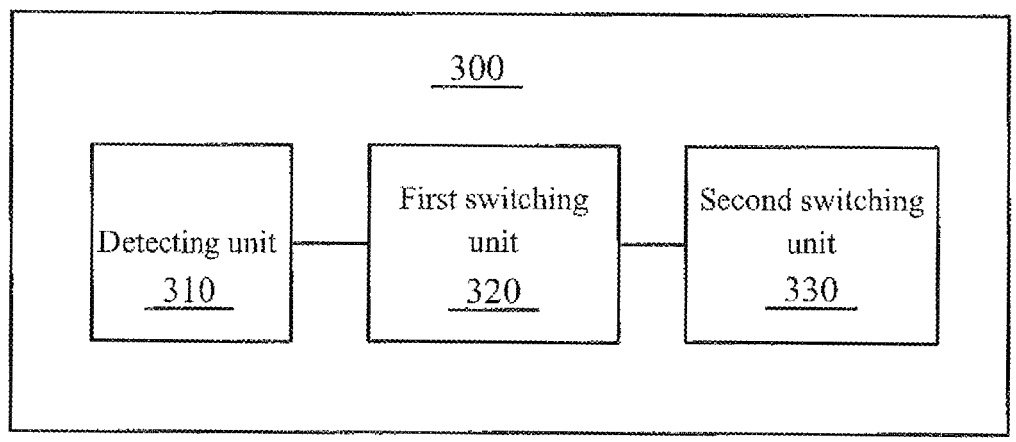
FIG. 3 is an exemplary structural block diagram of a power supply mode switching apparatus 300 applied to an electronic device according to an embodiment of the present disclosure.
Figure 4:
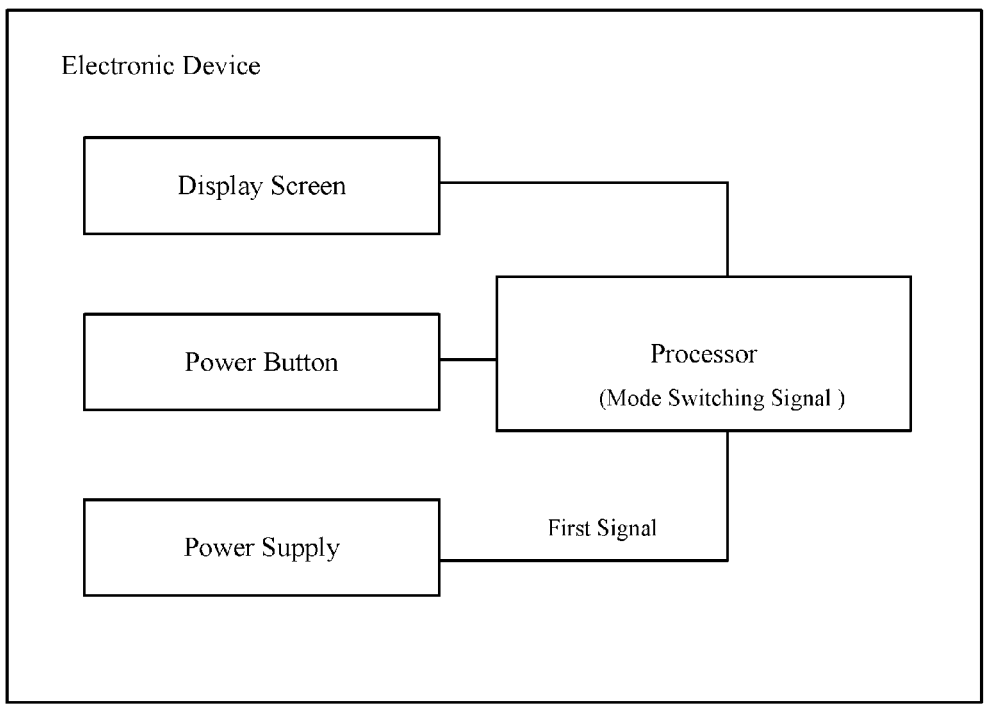
FIG. 4 illustrates a configuration of an embodiment of an electronic device that includes a display screen, a power button, power supply, a processor for generating and receiving the mode switching signal to trigger the first signal.

Hereinafter, a power supply mode switching apparatus 300 will be illustrated with reference to FIG. 3. FIG. 3 is an exemplary structural block diagram of the power supply mode switching apparatus 300 applied to an electronic device according to an embodiment of the present disclosure. The electronic device has a display screen that can be set in one of multiple directions, and in particular, the display screen may be set in a horizontal direction or in a vertical direction perpendicular to a horizontal plane.

Next, the power supply mode switching apparatus 300 applied to the electronic device according to the embodiment of the present disclosure will be described with reference to FIG. 3. A shown in FIG. 3, the apparatus 300 may comprise: a detecting unit 310, a first switching unit 320, and a second switching unit 330.

In particular, the detecting unit 310 may be configured to detect a mode switching signal of the electronic device. In particular, the mode switching signal may be generated by a gesture detection module of the electronic device. Generally, whether a mode change has occurred to the electronic device can be detected via various sensors. In an embodiment of the present disclosure, an acceleration sensor may be used to detect a posture or gesture change of the electronic device, when it is detected via the acceleration sensor that the electronic device has switched from a first mode to a second mode or from the second mode to the first mode, the gesture detection module can always generate a corresponding mode switching signal, and the detecting unit 310 may be configured to detect the mode switching signal of the electronic device.

The first switching unit 320 may be configured to, if the mode switching signal detected indicates to switch the electronic device from the first mode to the second mode, switch a power supply mode of the electronic device from a first power supply mode to a second power supply mode. An angle between a display screen of the electronic device and a horizontal plane may be not less than 45 degrees in the first mode, and the angle between the display screen of the electronic device and the horizontal plane may be less than 45 degrees in the second mode. Specifically, the display screen of the electronic device may be perpendicular to the horizontal plane in the first mode, and the display screen of the electronic device may coincide with the horizontal plane in the second mode.

In addition, in an embodiment of the present disclosure, it is also possible to set the first mode of the electronic device as a mode of the electronic device in which the angle between the display screen of the electronic device and the horizontal plane is more than a first predetermined angle and less than 90 degrees. In another embodiment of the present disclosure, it is also possible to set the second mode of the electronic device as a mode of the electronic device in which the angle between the display screen of the electronic device and the horizontal plane is less than a second predetermined angle. The first predetermined angle may generally be more than 45 degrees and less than 90 degrees, for instance, in an example of the present disclosure, the first predetermined angle may be set as 70 degrees. The second predetermined angle may generally be less than 45 degrees, for instance, in an example of the present disclosure, the second predetermined angle may be set as 20 degrees. That is to say, the first mode of the electronic device may be set as a mode of the electronic device in which it is detected that the angle between the display screen of the electronic device and the horizontal plane closes to or is 90 degrees; the second mode of the electronic device may be set as a mode of the electronic device in which it is detected that the angle between the display screen of the electronic device and the horizontal plane closes to or is 0 degrees.

In addition, when it is detected that a power button has been pressed in the first power supply mode, a first signal of the electronic device may be triggered immediately; and it is required to detect a first operation of a user continuously after it is detected that the power button has been pressed in the second power supply mode, the first signal of the electronic device is triggered until the first operation of the user has been detected. The first signal may be a power-on signal or a power-off signal. The first operation of the user may include that the user keeps pressing the power button for longer than 2 seconds, or the user performs a touch gesture operation on the electronic device to power on or power off the electronic device according to a screen prompt. In an example, the time for which the user keeps pressing the power button may be set as a value more than 2 seconds.

For instance, in an example of the present disclosure, the first mode of the electronic device is set as the mode in which the angle between the display screen of the electronic device and the horizontal plane is not less than 45 degrees, and the second mode of the electronic device is set as the mode in which the angle between the display screen of the electronic device and the horizontal plane is less than 45 degrees. In case that it is detected that the angle between the display screen of the electronic device and the horizontal plane is not less than 45 degrees, the power-off signal can be triggered immediately when the user presses the power button. In case that it is detected that the angle between the display screen of the electronic device and the horizontal plane is less than 45 degrees, when it is detected that the power button has been pressed, the detection is performed continuously, and the power-off signal is triggered until it is found out that the time for which the power button is pressed reaches 2 seconds or the user performs a touch gesture operation on the electronic device to power on or power off the electronic device according to the screen prompt.

In particular, the display screen of the electronic device may be perpendicular to the horizontal plane in the first mode, and the display screen of the electronic device may coincide with the horizontal plane in the second mode. In this case, when it is detected that the display screen of the electronic device is in the vertical direction, the power-off signal may be triggered immediately when the user presses the power button; whereas when it is detected that the display screen of the electronic device is in the horizontal direction, the power-off signal is triggered only when it is detected that the time for which the user continuously presses the power button reaches 2 seconds or the user performs a touch gesture operation on the electronic device to power on or power off the electronic device according to the screen prompt after it is detected that the user has pressed the power button.

In addition, in an embodiment of the present disclosure, it is also possible to set the first mode of the electronic device as a mode of the electronic device in which the angle between the display screen of the electronic device and the horizontal plane is more than a first predetermined angle and less than 90 degrees, and set the second mode of the electronic device as a mode of the electronic device in which the angle between the display screen of the electronic device and the horizontal plane is less than a second predetermined angle. That is to say, the first mode of the electronic device is set as a mode of the electronic device in which it is detected that the angle between the display screen of the electronic device and the horizontal plane closes to or is 90 degrees; the second mode of the electronic device is set as a mode of the electronic device in which it is detected that the angle between the display screen of the electronic device and the horizontal plane closes to or is 0 degrees. In this case, when it is detected that the display screen of the electronic device closes to or is 90 degrees, the power-off signal can be triggered immediately when the user presses the power button; whereas when it is detected that the display screen of the electronic device closes to or is 0 degrees, the power-off signal is triggered only when it is detected that the time for which the user continuously presses the power button reaches 2 seconds or the user performs a touch gesture operation on the electronic device to power on or power off the electronic device according to the screen prompt after it is detected that the user has pressed the power button.

The second switching unit 330 may be configured to, if the mode switching signal detected indicates to switch the electronic device from the second mode to the first mode, switch the power supply mode of the electronic device from the second power supply mode to the first power supply mode. For instance, in an example of the present disclosure, the angle between a display screen of the electronic device and a horizontal plane may be not less than 45 degrees in the first mode, and the angle between the display screen of the electronic device and the horizontal plane may be less than 45 degrees in the second mode. Accordingly, when it is detected that the angle between the display screen of the electronic device and the horizontal plane rotates from being less than 45 degrees to being not less than 45 degrees, the power supply mode of the electronic device may be switched to a mode in which the power-off signal may be triggered immediately after the user presses the power button; when it is detected that the angle between the display screen of the electronic device and the horizontal plane rotates from being not less than 45 degrees to being less than 45 degrees, the detection is performed continuously when it is detected that the user presses the power button, and the power-off signal is triggered until it is found out that the time for which the power button is pressed reaches 2 seconds or the user performs a touch gesture operation on the electronic device to power on or power off the electronic device according to the screen prompt.

Accordingly, by using the power supply mode switching apparatus 300 provided by the present disclosure, some optimizations can be carried out on the power managing mode of the conventional Tablet PCs, so that Tablet PCs will not enter into the power-off mode immediately when the user presses the power button by accident in the intelligent desktop mode of Tablet PCs, the intelligent desktop mode of Tablet PCs becomes more practical and using experience of the user is improved.

As will be appreciated by those of ordinary skill in the art, units and algorithm steps described in combination with the embodiments disclosed herein can be implemented by way of electronic hardware, computer software, or a combination of the two. To clearly illustrate the interchangeability between hardware and software, components and steps of respective examples have already been described in a general way in terms of functions in the above description. These functions are to be executed by hardware manner or software manner depending upon the particular application of the technique process and design constraints. Those skilled in the art can use different methods to achieve the described functions with respect to each specific application, but such implementation should not be construed as going beyond the scope of the present disclosure.

As will be understood by those skilled in the art, various modifications, combinations, partial combinations and replacements may be made by those skilled in the art depending on design requirements and other factors, as long as these modifications, combinations, partial combinations and replacements are within the scope of the attached claims and their equivalents.

The invention claimed is:

1. A power supply mode switching method applied to an electronic device, the method comprising:
   detecting a mode switching signal of the electronic device;
   switching a power supply mode of the electronic device from a first power supply mode to a second power supply mode if the mode switching signal detected indicates to switch the electronic device from a first mode to a second mode; and
   switching the power supply mode of the electronic device from the second power supply mode to the first power supply mode if the mode switching signal detected indicates to switch the electronic device from the second mode to the first mode,
   wherein, when it is detected that a power button has been pressed in the first power supply mode, a first signal of the electronic device is triggered immediately; and,
   when it is detected that a power button has been pressed in the second power supply mode, it is required to detect a first operation of a user continuously until the first operation of the user has been detected, and when the first operation is detected, the first signal of the electronic device is triggered.

2. The power supply mode switching method as claimed in claim 1, wherein an angle between a display screen of the electronic device and a horizontal plane is not less than 45 degrees in the first mode; and
   the angle between the display screen of the electronic device and the horizontal plane is less than 45 degrees in the second mode.

3. The power supply mode switching method as claimed in claim 2, wherein the first signal is a power-on signal or a power-off signal.

4. The power supply mode switching method as claimed in claim 1, wherein a display screen of the electronic device is perpendicular to the horizontal plane in the first mode.

5. The power supply mode switching method as claimed in claim 1, wherein a display screen of the electronic device coincides with the horizontal plane in the second mode.

6. The power supply mode switching method as claimed in claim 1, wherein the first operation of the user includes that the user keeps pressing the power button for longer than 2 seconds, or the user performs a touch gesture operation on the electronic device to power on or power off the electronic device according to a screen prompt.

7. The power supply mode switching method as claimed in claim 1, wherein the mode switching signal is generated by a gesture detection of the processor of the electronic device.

8. A power supply mode switching apparatus applied to an electronic device, the apparatus comprising:
  a processor configured to detect a mode switching signal of the electronic device;
  and, if the mode switching signal detected indicates to switch the electronic device from a first mode to a second mode, switch a power supply mode of the electronic device from a first power supply mode to a second power supply mode;
  and, if the mode switching signal detected indicates to switch the electronic device from the second mode to the first mode, switch the power supply mode of the electronic device from the second power supply mode to the first power supply mode,
  wherein, when it is detected that a power button has been pressed in the first power supply mode, a first signal of the electronic device is triggered by the processor immediately; and,
  when it is detected that a power button has been pressed in the second power supply mode, it is required to detect a first operation of a user continuously until the first operation of the user has been detected, and when the first operation is detected, the first signal of the electronic device is triggered by the processor.

9. The power supply mode switching apparatus as claimed in claim 8, wherein an angle between a display screen of the electronic device and a horizontal plane is not less than 45 degrees in the first mode and
  the angle between the display screen of the electronic device and the horizontal plane is less than 45 degrees in the second mode.

10. The power supply mode switching apparatus as claimed in claim 8, wherein the first signal is a power-on signal or a power-off signal.

11. The power supply mode switching apparatus as claimed in claim 8, wherein a display screen of the electronic device is perpendicular to the horizontal plane in the first mode.

12. The power supply mode switching apparatus as claimed in claim 8, wherein a display screen of the electronic device coincides with the horizontal plane in the second mode.

13. The power supply mode switching apparatus as claimed in claim 8, wherein the first operation of the user includes that the user keeps pressing the power button for longer than 2 seconds, or the user performs a touch gesture operation on the electronic device to power on or power off the electronic device according to a screen prompt.

14. The power supply mode switching apparatus as claimed in claim 9, wherein the mode switching signal is generated by a gesture detection of the processor of the electronic device.

\* \* \* \* \*